June 14, 1960    J. M. JESSUP    2,940,176
HORIZON INDICATOR
Filed April 3, 1957
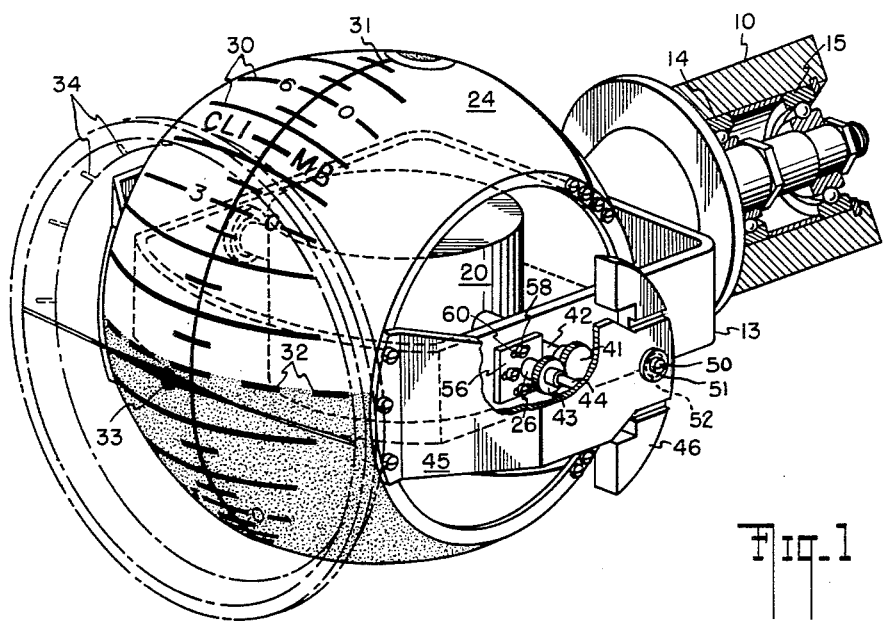
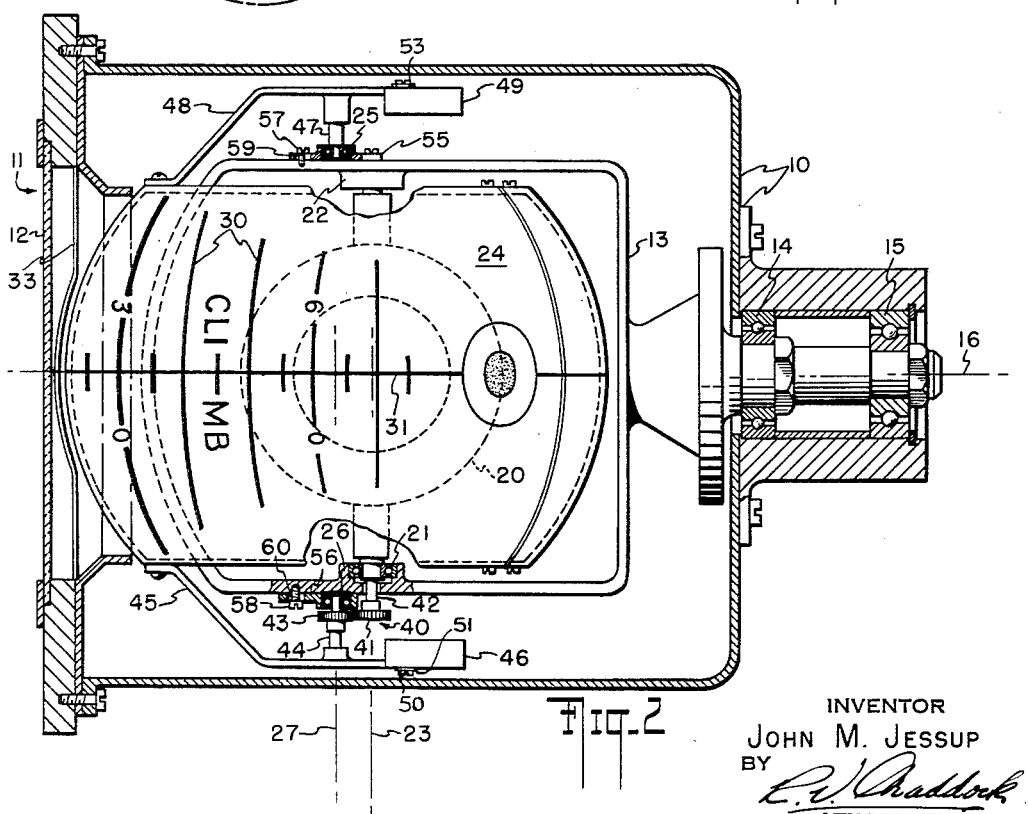
INVENTOR
JOHN M. JESSUP
BY
C. J. Chaddock
ATTORNEY

United States Patent Office 2,940,176
Patented June 14, 1960

2,940,176

HORIZON INDICATOR

John M. Jessup, Grand Rapids, Mich., assignor to Sperry Rand Corporation, Great Neck, N.Y., a corporation of Delaware Filed Apr. 3, 1957, Ser. No. 650,489

4 Claims. (Cl. 33—204)

This invention relates to improvements in horizon indicators for aircraft and more specifically to improvements in gyro-horizons or gyro-verticals, which are also known as attitude gyros.

The present invention is an improvement over Patent No. 2,492,992, entitled Gyro-Horizon of A. J. Handel, issued January 3, 1950. Both the present invention and said Handel patent provide a realistic presentation to the pilot at all times irrespective of the type of maneuver. Both provide an horizon indicator in which the artificial horizon apparently moves in the same sense as the natural horizon appears to move under all conditions. The construction of both horizon indicators have been improved by separating the sphere or body bearing the horizon markings from the rotor case and providing means for causing the sphere to move in the opposite direction from that in which the rotor case appears to move with respect to the instrument housing upon pitching maneuvers of the aircraft while retaining the same apparent movement upon banking of the aircraft. If one views these movements as occurring in space, rather than with respect to the aircraft on which the instrument is mounted, the sphere is caused to pitch in the same direction as the housing (or the aircraft) but through a substantially greater angle.

The construction of the present invention has been improved over the Handel patent in several ways including but not necessarily limited to the features to be presently described. One of the features involves displacing the principal axis of the sphere parallel to the minor axis of the rotor case in lieu of having the aforementioned axes coincident as disclosed in the Handel patent. Another feature involves the means for supporting the sphere for relative movement with respect to the rotor case. The improved construction is simpler and more economical to manufacture while providing a more accurate and readily adjustable instrument.

In the prior art, including the aforementioned Handel patent, the rotor case was usually mounted in a bifurcated gimbal having a substantially U shape. The design of the U-shaped gimbal was dictated by the requirement of the sphere being attached to the rotor case, or by the sphere having its axes coincident with the axes of the rotor case, and since it is considered undesirable to have the gimbal projecting in front of the sphere, the gimbal was foreshortened into a U shape. This provided a cantilevered structure which, particularly during turns, was subjected to acceleration forces that deflected the gimbal and contributed to error in the instrument indication. In the present invention, this limitation is overcome as the principal axis of the sphere is parallel and in spaced relation to the minor axis of the rotor case thereby permitting the rectangular gimbal to pass through the hollow sphere without obstructing the face of the instrument.

The present invention utilizes a substantially rectangular gimbal in lieu of the U-shaped gimbal to improve the structural rigidity and minimize deflections due to acceleration forces. To maintain a relatively consistent thermal coefficient of expansion throughout the instrument, thereby minimizing differential expansion of the components of the instrument and resultant weight shift, the rectangular gimbal is preferably constructed of the same material as that of the other portions of the instrument. In order to improve the above characteristics, while maintaining minimum weight requirements, the rectangular gimbal is preferably designed of sheet metal thereby obtaining equal strength with less weight than a cast member.

The present invention also has an adjustable gear train in which the backlash can be adjusted to a minimum value thereby minimizing the wear on the gear train and also providing a more accurate indication of the pitch attitude.

In particular, the present invention comprises a gyroscopic horizon indicator having a housing with a rotor case universally mounted therein to pivot about major and minor mutually perpendicular axes and a hollow sphere or body with indicia thereon arranged with its principal axis of curvature parallel to said minor axis of the rotor case. Means are included for pivotally mounting said body to move about said principal axis and motion reversing means operatively connect the body and the rotor case. In the preferred embodiment shown, the motion reversing means is adjustable. Preferably, the rotor case is mounted within a substantially rectangular gimbal that passes through the hollow sphere or body without obstructing the instrument presentation.

It is, therefore, an object of the present invention to provide a gyroscopic attitude indicating instrument supplying a realistic presentation under all conditions of flight.

It is a further object of the present invention to provide a gyroscopic attitude indicating apparatus having a substantially rectangular outer gimbal that does not obstruct the instrument presentation.

It is also an object of the present invention to provide a gyroscopic attitude indicating instrument having motion reversing means that is adjustable.

Various other objects, advantages and features of the present invention will become apparent from the following description taken in conjunction with the accompanying drawings, wherein like reference characters indicate like elements, in which:

Fig. 1 is a perspective view of the attitude gyro of the present invention with the housing partially cut away for clarity and with certain of the elements in section; and Fig. 2 is a section through the housing of the attitude gyro showing a plan view of the interior elements thereof with certain of the elements in section.

Referring to Figs. 1 and 2 of the drawings, the gyro horizon of the present invention is mounted within a housing 10 having an opening 11 in the end thereof covered by a transparent member in the form of a window 12 through which the gyroscopic indicator can be viewed. Such instruments are generally mounted by attaching the housing 10 to the instrument panel board of the aircraft in which it is employed with the window 12 thereof normal to the fore and aft of longitudinal axis of the craft.

The outer gimbal 13 is pivotally mounted in the housing 10 by means of the spaced bearings 14 and 15, which support the same for movement about a normally horizontal major axis 16 that is parallel to or coincident with the longitudinal axis of the craft about which the craft banks. In the preferred embodiment shown, the outer gimbal 13 is rectangularly shaped and preferably constructed of sheet metal having the same thermal coefficient of expansion as the other components of the instrument. The use of steel for both inner and outer gimbals has been found satisfactory to provide maximum rigidity and minimum mass shift usually caused by elements with mismatched coefficients of thermal expansion.

The rotor case or inner gimbal 20 is pivotally mounted within the rectangular gimbal 13 by means of bearings 21 and 22 for movement about an axis 23 which is normally horizontal and is perpendicular to the said major axis 16. Axis 23 is the minor axis of the rotor case 20. The rotor case 20 is thus universally supported within the housing 10 for movement about said mutually perpendicular axes 16 and 23. The minor axis 23 of the rotor case 20 is parallel to or coincident with the pitch axis of the craft such that as the craft climbs or dives, i.e., moves about its pitch axis, the rectangular gimbal 13 attached to the housing 10 moves in the same direction and degree relative to the rotor case 20 about the minor axis 23. Within the rotor case 20 a gyroscopic rotor (not shown) is suitably spun by conventional means (not shown) about a substantially vertical axis. Suitable conventional erection means (not shown) may also be employed to erect the rotor case 20 such that it is normally maintained substantially free of tilt about its respective axes of support.

The indicating body or truncated sphere 24 of the present invention is generally similar to the equivalent part shown and described in Patent No. 2,546,989 to O. E. Esval et al., entitled Attitude Gyro, issued April 3, 1951, except the sphere 24 is displaced from and moves in a manner different from the movement of the rotor case 20 to be described. As shown, the body 24 has the form of a hollow truncated sphere that surrounds and encloses the rotor case 20. The sphere 24 is pivotally mounted on the rectangular gimbal 13 by means of bearings 25 and 26. The sphere 24 is mounted for movement about its principal axis of curvature 27 which is displaced from and parallel to the minor axis 23 of the rotor case 20. Preferably, the principal axis 27 is displaced from the minor axis 23 in such a manner as to allow at least a portion of the rectangular gimbal 13 to pass through the hollow sphere 24 without obstructing the face of the instrument.

The peripherally curved surfaces of the body or sphere 24 are provided with indicia thereon. The indicia take the form of pitch and roll markings provided by the graduated parallel latitude lines 30 and by the central meridian line 31, respectively. The indicia preferably also includes shading the lower half of the sphere 24 differently from the upper half of the shell to represent the sky and the earth, respectively. The equatorial line 32 divides the sphere 24 into its upper and lower halves, forming a sky-simulating portion and a ground-simulating portion, respectively, which may be painted, for example, yellow and black, respectively. The sphere 24 is preferably constructed of two suitably joined parts for ease of construction.

The indicia on the sphere 24 may be interpreted in relation to a fixed horizontal index 33 which, preferably, is in the form of a symbolic miniature airplane or a fixed horizontal line. In determining the attitude of the aircraft about its pitch axis, the pilot observes the relative position of the symbolic miniature airplane 33 situated behind the window 12 with respect to the pitch lines 30 and the equatorial line 32 which form a part of the pitch indicia. Fixed bank index lines 34 are suitably provided at the circumferential area of the window 12 to be read in conjunction with the meridian line 31 to determine the attitude of the craft about its longitudinal or roll axis.

In order to provide a realistic presentation to the pilot under all conditions of flight, the sphere 24 having the above mentioned indicia thereon is driven in a direction opposite to that of the rotor case 20 in pitch by a motion reversing means between the sphere and the rotor case. In the preferred form shown, the motion reversing means includes gear train 40. Gear 41 of the gear train 40 is fixedly attached to an extension of the trunnion 42 of the rotor case 20 that projects through gimbal 13, and is concentric with the pitch or minor axis 23. Gear 41 meshes with a second gear 43, which is concentric with the principal axis 27 of the sphere 24.

Gear 43 is fixedly coupled to shaft 44. One end of shaft 44 is rotatably supported in bearing 26 while the other end connects to arm 45. One end of arm 45 is connected to sphere 24. The other extremity of arm 45 supports an adjustable counterweight 46. Counterweight 46 is adjustable by means of screw 50 and washer 51 that cooperate with slot 52 in arm 45 to adjust the position of counterweight 46 relative to arm 45 for precisely counterbalancing the weight of sphere 24. In a similar manner, counterweight 49 is adjustable relative to arm 48 by means of screw 53. Bearing 25 is diametrically opposed to bearing 26 on the principal axis 27 and rotatably supports shaft 47 that is connected to arm 48. One end of arm 47 is connected to sphere 24 while the other end supports adjustable counterweight 49.

To minimize wear on the gear train 40 and to provide a more accurate instrument, a backlash adjusting means may be utilized. In the preferred form shown, bearings 25 and 26 are mounted on plates 55 and 56 respectively, that are adjustably fastened to rectangular gimbal 13. The adjustable fastening device may take the form of screws 57 and 58 that cooperate with slotted apertures 59 and 60 in plates 55 and 56 respectively, to adjust the backlash between gears 41 and 43.

With the described mechanism, when the aircraft climbs, the rotor case 20 remains fixed in space with the spin axis of the rotor parallel to its former direction. Gear 41, fixedly coupled to the rotor case 20, also remains stationary. Gear 43 thus revolves around gear 41 rotating principal axis 27 counterclockwise around minor axis 23 as viewed in Fig. 1. The rotation of gear 43 imparts rotational movement to the sphere 24 which is in the same direction as the movement of the gimbal 13 and, preferably, by means of a suitable gear ratio, the angle through which the sphere 24 moves is approximately twice the angle that the gimbal 13 moves. The reverse action occurs when the craft dives.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. In a gyroscopic apparatus having a housing, a window in said housing, a rotor case having a rotor mounted therein for spinning about a first axis, a closed substantially rectangular gimbal for supporting said rotor case for movement about a second axis normal to said first axis, means for supporting said gimbal in said housing for rotation about a third axis normal to said first and second axes, an attitude indicating substantially spherical body pivotally mounted on said gimbal for rotation about a fourth axis parallel to, but displaced from, said second axis, a portion of said body being disposed intermediate said window and said gimbal whereby said gimbal is invisible through said window, and drive means coupled between said rotor case and said body for rotating said body about said fourth axis.

2. A gyroscopic apparatus as claimed in claim 1, in which said spherical body is substantially hollow and at least a portion of said rectangular gimbal passes through said hollow body.

3. A gyroscopic horizon indicator for aircraft having a housing, a gimbal pivotally mounted within the housing for rotation about a first normally horizontal axis, a rotor case pivotally mounted on said gimbal for rotation about a second normally horizontal axis perpendicular to said first axis, a rotor mounted in said rotor case for rotation about a substantially vertical axis normally substantially perpendicular to said first and second axes, arm means pivotally mounted on the gimbal for rotation about a third axis parallel to the second axis, an attitude indicating curved hollow body connected to said arm means for rotation about said third axis, said rotor case being mounted within said body, and motion reversing means connecting said rotor case and said arm means for rotating said body about said third axis in an amount proportional to and in a direction opposite to the rotation of the rotor case about said second axis.

4. An attitude-indicating instrument comprising a housing, a window in a wall of the housing, a gimbal ring mounted in the housing for rotation about a normally horizontal axis perpendicular to the window, a rotor-bearing frame carrying a rotor which, in operation, normally has its axis of rotation vertical, said rotor-bearing frame being mounted in the gimbal ring for rotation about a normally horizontal axis perpendicular to the axis of the gimbal ring, a fixed reference at the center of the window, arm means pivotally mounted on the gimbal for rotation about an axis parallel to and displaced from the axis of the rotor-bearing frame in the gimbal ring, a curved hollow horizon-line indicating member viewable through the window and displaceable in the window relatively to the fixed reference, said rotor-bearing frame being disposed within said member, said member being connected to said arm means for rotation about said axis parallel to and displaced from the axis of the rotor-bearing frame in the gimbal ring, the horizon line being at the junction of two areas on the member of contrasting colors, one depicting the sky and the other depicting the ground, and mechanical means interconnecting the rotor-bearing frame and the arm means to produce relative displacement of the indicating member and fixed reference in dependence on relative displacement of the rotor-bearing frame and the gimbal ring.

References Cited in the file of this patent

UNITED STATES PATENTS

| | | |
|---|---|---|
| 2,333,983 | Carlson | Nov. 9, 1943 |
| 2,492,992 | Handel | Jan. 3, 1950 |
| 2,546,989 | Esval et al. | Apr. 3, 1951 |
| 2,553,309 | Gabrielson et al. | May 15, 1951 |
| 2,630,016 | Braddon et al. | Mar. 3, 1953 |

FOREIGN PATENTS

| | | |
|---|---|---|
| 140,482 | Great Britain | Apr. 1, 1920 |
| 918,604 | France | Oct. 28, 1946 |
| 666,615 | Great Britain | Feb. 13, 1952 |